US011245783B2

(12) United States Patent
Xiao et al.

(10) Patent No.: US 11,245,783 B2
(45) Date of Patent: Feb. 8, 2022

(54) TERMINAL DEVICE

(71) Applicant: AAC Technologies Pte. Ltd., Singapore (SG)

(72) Inventors: Bo Xiao, Shenzhen (CN); Xiaodong Liu, Shenzhen (CN); Ronglin Linghu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 20 days.

(21) Appl. No.: 16/991,038

(22) Filed: Aug. 12, 2020

(65) Prior Publication Data

US 2020/0412859 A1 Dec. 31, 2020

Related U.S. Application Data

(63) Continuation of application No. PCT/CN2019/094004, filed on Jun. 29, 2019.

(51) Int. Cl.
*H04R 1/02* (2006.01)
*H04M 1/03* (2006.01)
*H04M 1/60* (2006.01)
*H04R 9/06* (2006.01)

(52) U.S. Cl.
CPC ......... *H04M 1/035* (2013.01); *H04M 1/6033* (2013.01); *H04R 9/06* (2013.01); *H04R 2400/11* (2013.01); *H04R 2499/11* (2013.01)

(58) Field of Classification Search
CPC .............................. H04R 2499/11; H04R 1/02
USPC ............................................ 381/87, 333–336
See application file for complete search history.

(56) References Cited

U.S. PATENT DOCUMENTS

2013/0329931 A1* 12/2013 Tan .......................... H04R 1/02
381/355

* cited by examiner

*Primary Examiner* — George C Monikang
(74) *Attorney, Agent, or Firm* — W&G Law Group

(57) ABSTRACT

The invention provides a terminal device having a main body, a sounding assembly and a cover plate. The sounding assembly includes a housing and a sounding body. The housing has an accommodating groove and a first sounding channel. The main body has a second sounding channel and a first sound emitting hole. The cover plate has a first through hole. When the sounding assembly is located at the first position, the sound is propagated to the outside through the first through hole, the second sounding channel and the first sound emitting hole in sequence. When the sounding assembly is located at the second position, the sound is propagated to the outside through the first sounding channel. The present invention improves the problem that the sound effect is affected by airflow sound, piano sound, etc., generated by the terminal device in the speaker mode.

8 Claims, 11 Drawing Sheets

A-A

B-B

TERMINAL DEVICE

FIELD OF THE PRESENT INVENTION

The present invention relates to acoustoelectric field, and more particularly to a terminal device.

DESCRIPTION OF RELATED ART

With the rapid development of science and technology, people's pursuit for life quality has been increased higher. Portable multimedia audio-visual devices, such as laptops, mobile phones, etc., are used as experiencing terminal devices in daily life, people have increasingly higher requirements on them, especially the performance requirements of their sound effects. However, the terminal device in the related art generates airflow sound, piano sound, etc., when in the speaker mode, thereby affecting the sound effect of the terminal device.

Therefore, it is desired to provide a terminal device to solve the above-mentioned problem.

SUMMARY OF THE PRESENT INVENTION

The purpose of the present invention is to provide a terminal device, which provides a smoother front chamber channel in the speaker mode, and improves the problem that the sound effect is affected by airflow sound, piano sound, etc., generated by the terminal device in the speaker mode.

The technical solution of the present invention is as follows: a terminal device includes a main body and a sounding assembly. The sounding assembly includes a housing movably connected to the main body, and a sounding body accommodated in the housing. The housing includes a sounding surface and a back surface opposite to the sounding surface. The sounding surface is recessed toward the back surface to form an accommodating groove for accommodating the sounding body, and to form a first sounding channel communicating with the accommodating groove. The main body includes an exposed outer surface, an inner surface facing the sounding surface, and an extending surface extending from the inner surface to the outer surface. A receiving groove for accommodating the sounding assembly is formed by the inner surface and the extending surface. The inner surface is recessed in a direction away from the sounding body to form a second sounding channel extending to the outer surface, and a first sound emitting hole that communicates with the second sounding channel is formed on the outer surface correspondingly. The terminal device further includes a cover plate fixed on the inner surface and covering on the second sounding channel, and the cover plate is provided with a first through hole penetrating thereof and communicating with the second sounding channel.

The sounding assembly is moved between a first position and a second position in the receiving groove. When the sounding assembly is located at the first position, the accommodating groove is communicated with the first through hole, and the first sounding channel is covered by the main body. The sound generated by the sounding assembly is propagated to the outside of the terminal device through the first through hole, the second emitting path and the first sound emitting hole in sequence. When the housing drives the sounding body to move in a direction away from the first through hole to the second position, at least part of the housing is exposed outwards the terminal device, the first sounding channel is communicated with the outside of the terminal device, and the sound generated by the sounding assembly is propagated to the outside of the terminal device through the first sounding channel.

Furthermore, the sounding assembly further includes a baffle covered on the housing. The accommodating groove and the first sounding channel are covered by the baffle, and the baffle is arranged and spaced apart from the sounding body to form a front chamber. The first sounding channel is communicated with the front chamber, the baffle is provided with a second through hole penetrating thereof and communicating with the front chamber. When the sounding assembly is located at the first position, the second through hole is communicated with the first through hole.

Furthermore, the baffle is further provided with second sound emitting holes communicating with the first sounding channel. When the sounding assembly is located on the second position, at least part of the second sound emitting holes are exposed to the main body and communicated with the outside of the terminal device.

Furthermore, the second sound emitting holes are arranged in an array on the baffle.

Furthermore, when the sounding assembly is located at the first position, the second through hole is arranged coaxially with the first through hole. A diameter of the second through hole is larger than a diameter of the first through hole.

Furthermore, the baffle is recessed on a side away from the sounding body to form a limiting slot, and the second sound emitting holes are arranged in a matrix form in the limiting slot.

Furthermore, the outer surface includes a front surface opposite to the inner surface, a side surface bending and extending from an edge of the front surface toward the inner surface, and a bottom surface connected to the side surface at an end away from the front surface. The bottom surface corresponding to the sounding assembly is recessed toward the front surface to form the receiving groove. The inner surface is extended to the side surface and connected with the side surface, and the first sound emitting hole is arranged on the side surface.

Furthermore, when the sounding assembly is located at the first position, the back surface and the bottom surface are spliced and coplanar.

DETAILED DESCRIPTION OF THE EXEMPLARY EMBODIMENT

Figure 1:
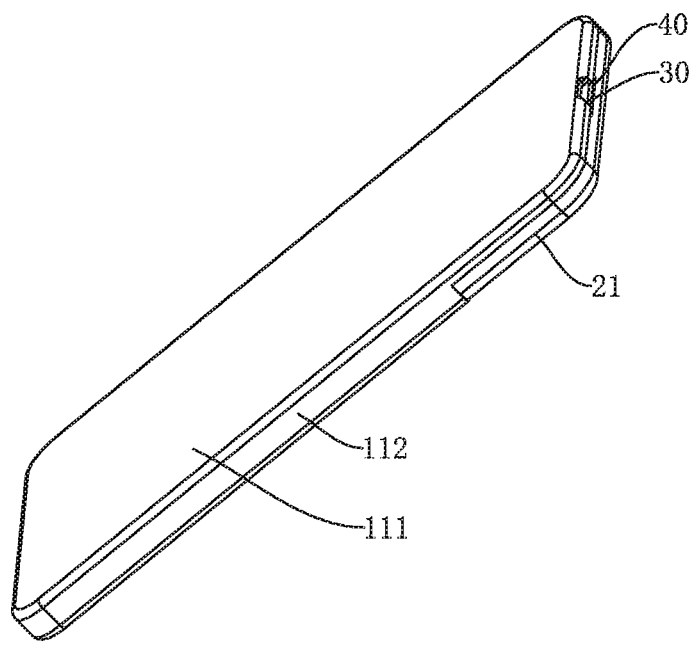
FIG. 1 is an isometric view of the terminal device with a sounding assembly located at a first position in a receiving groove according to the present invention.

The present invention will be further explained in combination with the drawings and embodiments.

Referring to FIG. 1 to FIG. 5, a terminal device includes a main body 10 and a sounding assembly 20 assembled on the main body 10. The sounding assembly 20 includes a housing 21 movably connected to the main body 10, and a sounding body 22 accommodated in the housing 21. The housing 21 includes a sounding surface 211 and a back surface 212 opposite to the sounding surface 211. The sounding surface 211 is recessed toward the back surface 212 to form an accommodating groove 2111 for accommodating the sounding body 22, and a first sounding channel 2112 communicating with the accommodating groove 2111. The main body 10 includes an exposed outer surface 11, an inner surface 12 facing the sounding surface 211, and an extending surface 13 extending from the inner surface 12 to the outer surface 13. A receiving groove 60 for accommodating the sounding assembly 20 is formed by the inner surface 12 and the extending surface 13. The inner surface 12 is recessed in a direction away from the sounding body 22 to form a second sounding channel 121 extending to the outer surface 11, and the outer surface 11 is formed a first sound emitting hole 1121 communicating with the second sounding channel 121 correspondingly. The terminal device further includes a cover plate 30 fixed on the inner surface 12 and covering the second sounding channel 121, and the cover plate 30 is provided with a first through hole 31 penetrating thereof and communicating with the second sounding channel 121. The sounding assembly 20 is moved between a first position and a second position in the receiving groove 60. When the sounding assembly 20 is located at the first position, the accommodating groove 2111 is communicated with the first through hole 31, and the first sounding channel 2112 is covered by the main body 10. The sound generated by the sounding assembly 20 is propagated to the outside of the terminal device through the first through hole 31, the second sounding channel 121 and the first sound emitting hole 1121 in sequence. When the housing 21 drives the sounding body 22 to move in a direction away from the first through hole 31 to the second position, at least part of the housing 21 is exposed outwards the terminal device, and the first sounding channel 2112 is communicated with the outside of the terminal device. The sound generated by the sounding assembly 20 is propagated to the outside of the terminal device through the first sounding channel 2112.

In the present invention, the terminal device includes a main body 10 and a sounding assembly 20 which are assembled together. The sounding assembly 20 includes a housing 21 and a sounding body 22, and the housing 21 is movably connected to the main body 10. A sounding surface 211 of the housing 21 is recessed toward a back surface 212 to form an accommodating groove 2111 and a first sounding channel 2112 communicating with each other. The accommodating groove 2111 is used to accommodate the sounding body 22. A receiving groove 60 for receiving the sounding assembly 22 is formed by an inner surface 12 and an extending surface 13 of the main body 10, and the inner surface 12 is recessed away from the sounding body 22 to form a second sounding channel 121. The outer surface 11 is provided with a first sound emitting hole 1121, the second sounding channel 121 is extended to the outer surface 11 and is communicated with the first sound emitting hole 1121. The terminal device further includes a cover plate 30 covered on the second sounding channel 121, and the cover plate 30 is provided with a first through hole 31 penetrating thereof and communicating with the second sounding channel 121. When the sounding assembly 20 is located at a first position in the receiving groove 60, the accommodating groove 2111 is communicated with the first through hole 31, and the first sounding channel 2112 is covered by the main body 10. The sounding body 22 produces sound, the sound is passed from the first sound emitting hole 1121 to the outside of the terminal device after going through the first through hole 31 and the second sounding channel 121. In this case, the terminal device is in the receiver mode. When the housing 21 is moved linearly relative to the main body 10 to drive the sounding body 22 to move away from the first through hole 31 to the second position, at least part of the housing 21 is exposed outwards the terminal device. The sound produced by the sounding body 22 is transmitted directly to the outside through the first sounding channel 2112. In this case, the terminal device is in the speaker mode. With this technical solution, two different sound emitting paths are provided in the speaker mode and the receiver mode, and a smoother sound emitting path is provided in the speaker mode, which improves the problem that the airflow sound, the piano sound, etc., generated by the terminal device in the speaker mode will affect the sound effect.

The housing 21 is movably connected to the main body 10 in the present invention, and an example of the connection between the housing 21 and the main body 10 is illustrated hereof. A magnet is fixed on the main body 10, and a coil repelling the polarity of the magnet are fixed on the housing 21. The magnet is connected to the coil through a spring, and the coil is electrically connected to the power supply of the terminal device. When the power supply is connected to the coil, the coil generates polarity and repels the magnet to stretch the spring to drive the housing 21 from the first position to the second position. When the power supply is disconnected from the coil, the coil loses the polarity, the spring contracts to drive the housing 21 from the second position to the first position, thus a moveable connection between the housing 21 and the main body 10 has been achieved. The movable connection between the housing and the main body is not limited in the present invention.

Figure 6:
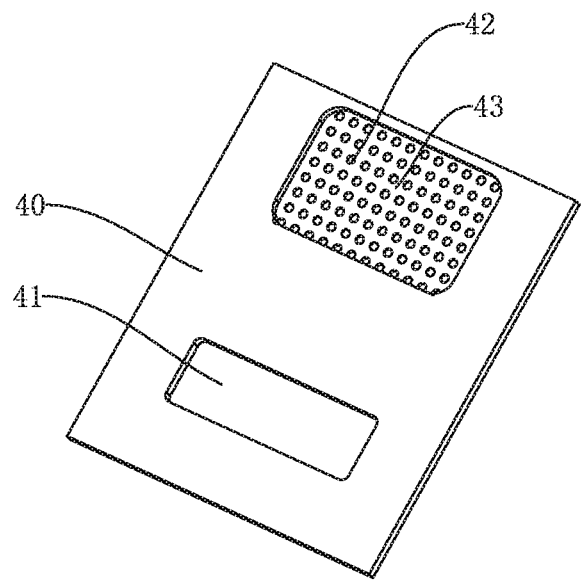
FIG. 6 is an isometric view of a baffle of the terminal device according to the present invention.
Figure 7:
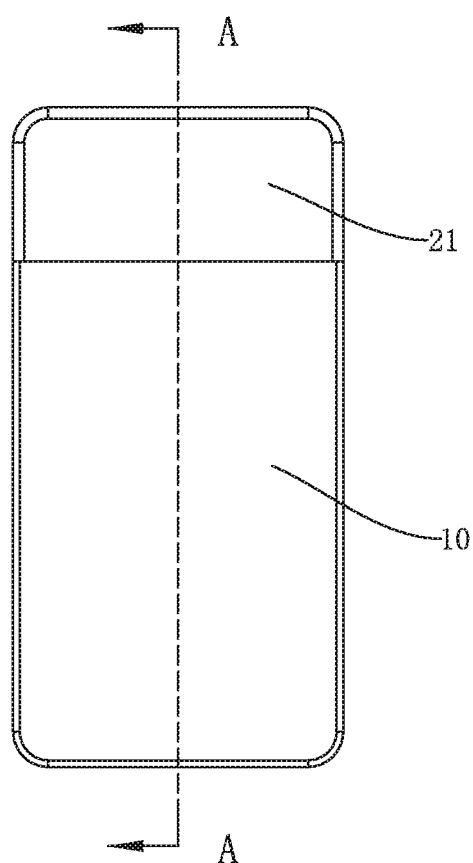
FIG. 7 is a bottom view of FIG. 1.
Figure 8:
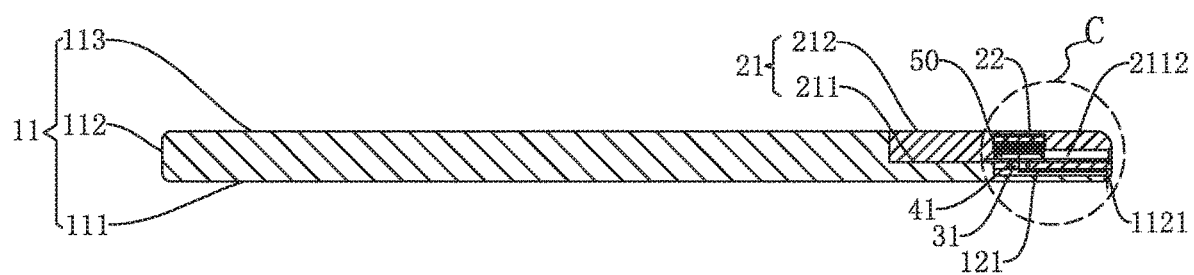
FIG. 8 is a cross-sectional view taken along line A-A in FIG. 7.

Furthermore, as shown in FIG. 6 to FIG. 8, the sounding assembly 20 further includes a baffle 40 covered on the housing 21. The accommodating groove 2111 and the first sounding channel 2112 are covered by the baffle 40. The baffle 40 is arranged and spaced apart from the sounding body 22 to form a front chamber 50, and the first sounding channel 2112 is communicated with the front chamber 50. The baffle 40 is provided with a second through hole 41 penetrating thereof and communicating with the front chamber 50. When the sounding assembly 20 is located at the first position, the second through hole 41 is communicated with the first through hole 31.

Figure 10:
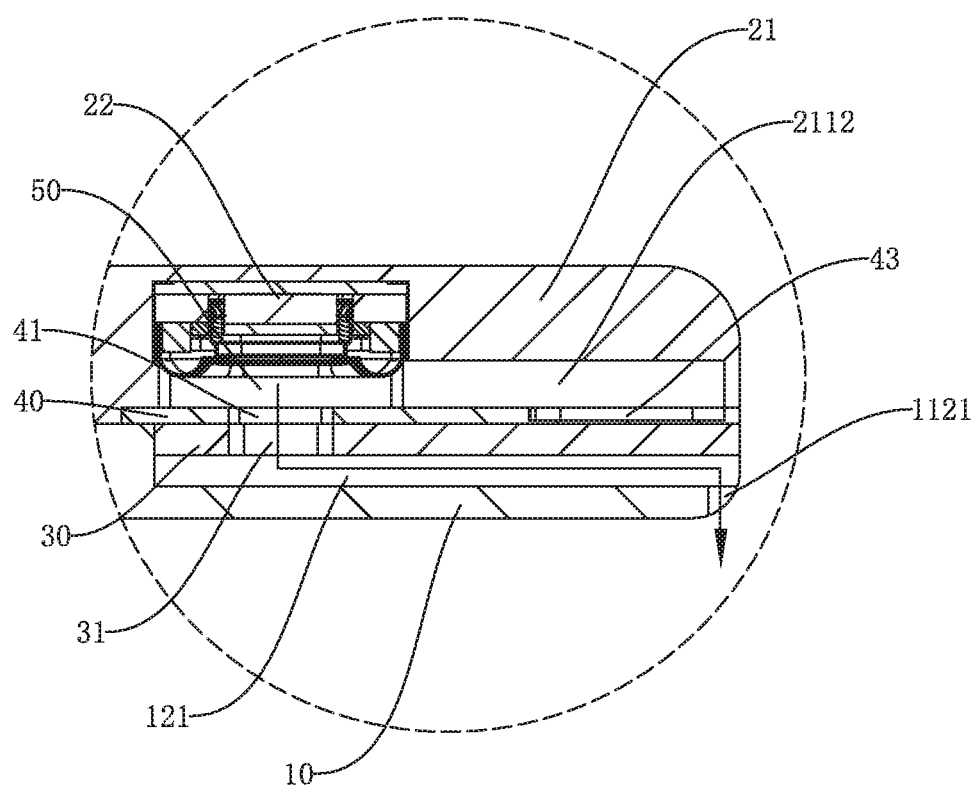
FIG. 10 is a partially enlarged view of part C shown in FIG. 8.

That is, the baffle 40 is arranged on the housing 21 for covering and sealing the accommodating groove 2111 and the first sounding channel 2112. The baffle 40 is arranged and spaced apart from the sounding body 22 to form the front chamber 50, so as to prevent the sound leakage due to the untight structure between the housing 21 and the main body 10. The baffle 40 is provided with the second through hole 41 penetrating thereof and communicating with the front chamber 50, so as to provide a smooth sound emitting channel for the receiver mode. As shown in FIG. 10, the housing 21 is located at the first position of the accommodating groove 2111 at this time, a direction of the arrow in the figure indicates the sound propagation path after the sound generation of the sounding body 22. The second through hole 41 is communicated with the first through hole 31, and the sound emitted by the sounding body 22 is passed through the second through hole 41, the first through hole 31, and the second sounding channel 121 sequentially, and then is propagated from the first sound emitting hole 1121, so as to realize the receiver mode of the terminal device.

Figure 9:
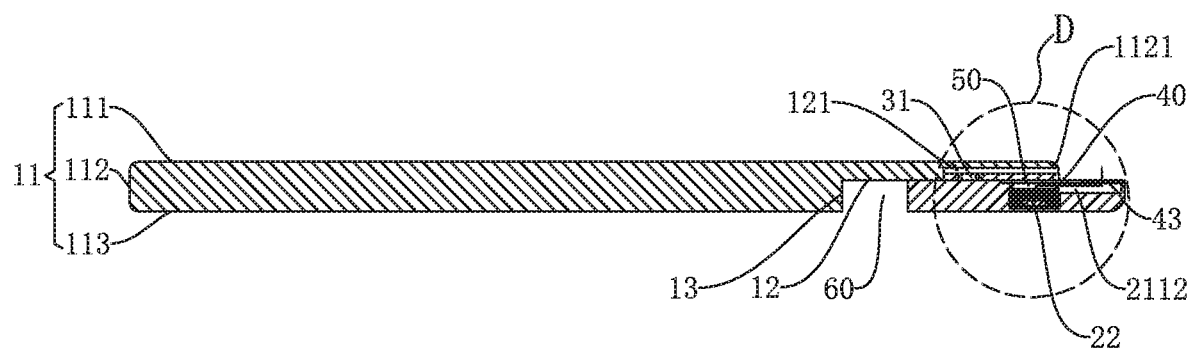
FIG. 9 is a cross-sectional view taken along line B-B in FIG. 2.
Figure 11:
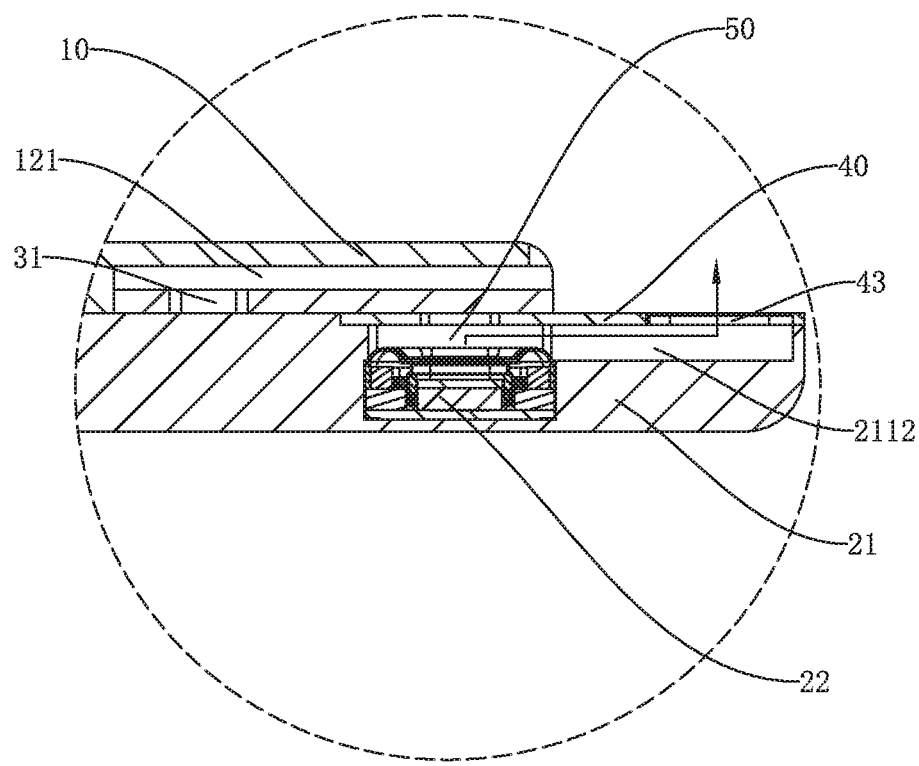
FIG. 11 is a partially enlarged view of part D shown in FIG. 9.

Referring to FIG. 6, FIG. 9 and FIG. 11, the baffle 40 is further provided with second sound emitting holes 42 communicating with the first sounding channel 2112. When the sounding assembly 20 is located at the second position, at least part of the second sound emitting holes 42 are exposed to the main body 10 and communicated with the outside of the terminal device. The second sound emitting holes 42 are arranged on the baffle 40 corresponding to the first sounding channel 2112. When the housing 21 is moved to the second position in the receiving groove 60 relative to the main body 10, the baffle 40 is moved with the housing 21, so that at least part of the second sound emitting holes 42 are exposed to the outside. The sounding body 22 produces sound, and the sound is propagated from the second sound emitting holes 42 to the outside through the first sounding channel 2112 in a large area, thereby achieving the speaker mode of the terminal device.

As shown in FIG. 6, the second sound emitting holes 42 are arranged in an array on the baffle 40. Preferably, the baffle 40 is recessed at a side away from the sounding body 22 to form a limiting slot 43. The second sound emitting holes 42 are arranged in a matrix form on the limiting slot 43. By setting the limiting slot 43 on the side of the baffle 40 away from the sounding body 22 and arranging the second sound emitting holes 42 in a matrix form on the bottom of the limiting slot 43, when the terminal device is in the speaker mode, the sound emitted by the sounding body 22 is gradually limited to the second sound emitting hole 42, thus to improve the sound quality of the terminal device in the speaker mode, thereby improving the user's experience of the terminal device.

Preferably, when the sounding assembly 20 is located at the first position, the second through hole 41 is arranged coaxially with the first through hole 31. A diameter of the second through hole 41 is larger than a diameter of the first through hole 31. That is, when the terminal device is in the receiver mode, the sound emitted by the sounding body 22 is gradually limited by the second through hole 41 and the first through hole 31 to the second sounding channel 121, and then is transmitted from the first sound emitting hole 1121.

Figure 2:
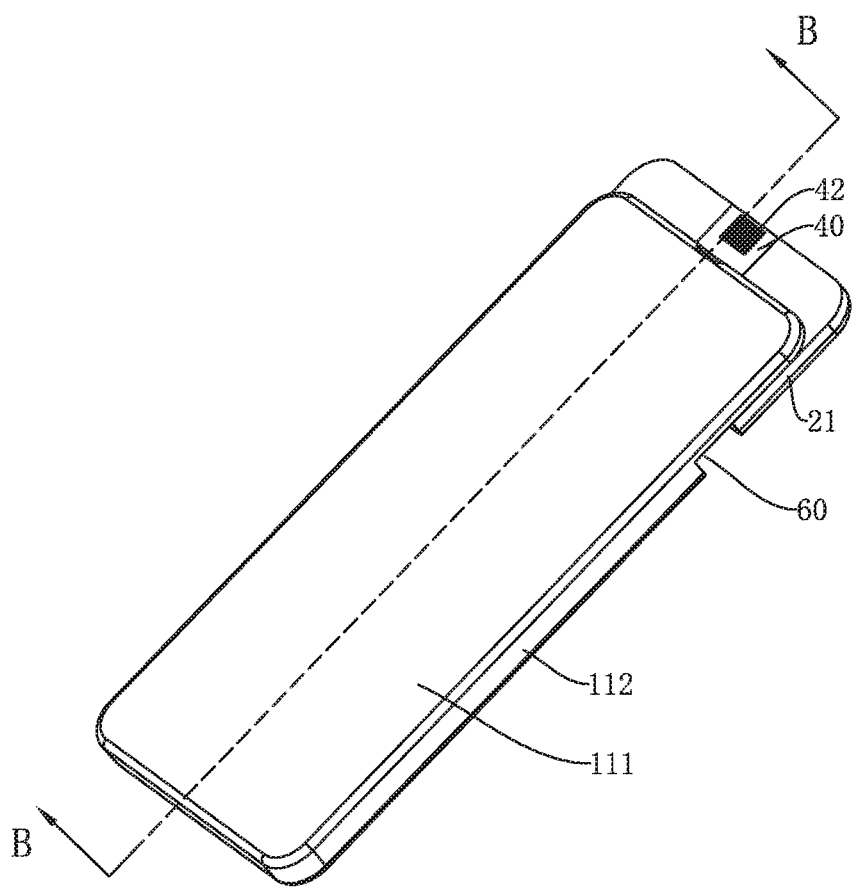
FIG. 2 an isometric view of the terminal device with a sounding assembly located at a second position in the receiving groove according to the present invention.
Figure 3:
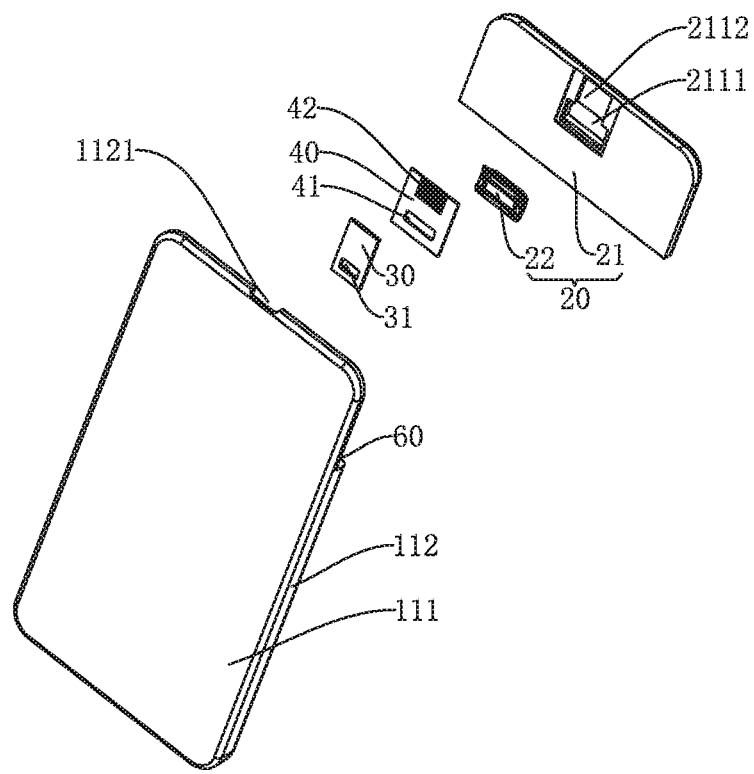
FIG. 3 is an exploded view of the terminal device according to the present invention.
Figure 4:
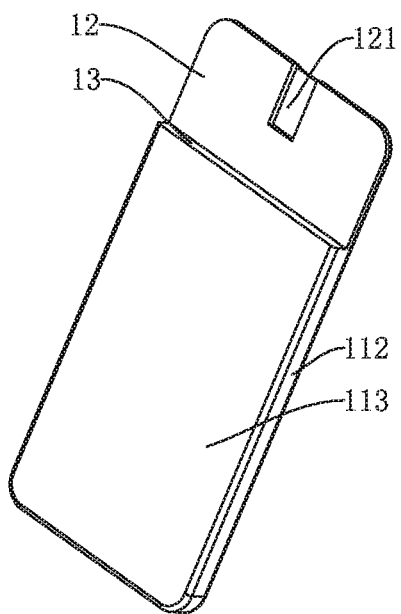
FIG. 4 is an isometric view of a main body of the terminal device according to the present invention.
Figure 5:
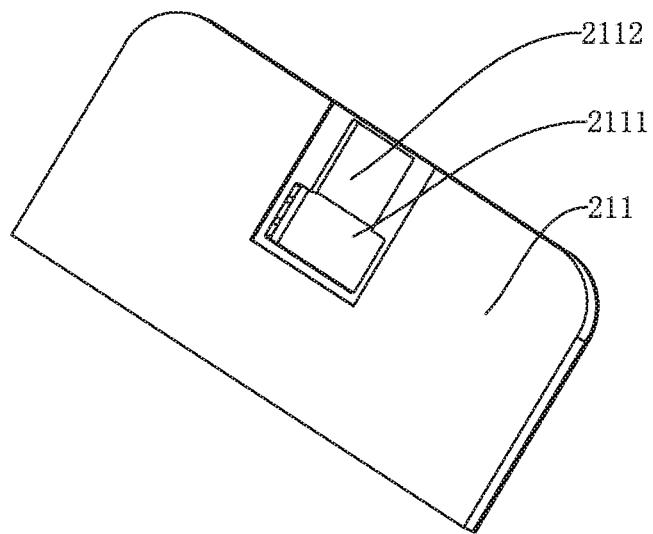
FIG. 5 is an isometric view of a housing of the terminal device according to the present invention.

Referring to FIGS. 2-4, the outer surface 11 includes a front surface 111 opposite to the inner surface 12, a side surface 112 bending and extending from an edge of the front surface 111 toward the inner surface 12, and a bottom surface 113 connected to the side surface 112 at an end away from the front surface 111. The bottom surface 113 is recessed toward the front surface 111 corresponding to the sounding assembly 20 to form a receiving groove 60. The inner surface 12 is extended to the side surface 112 and connected to the side surface 112. The first sound emitting hole 1121 is provided on the side surface 112. When the sounding assembly 20 is located at the first position, the back surface 212 and the bottom surface 113 are spliced and coplanar, so that the external surface of the terminal device is flat, and the appearance of the terminal device is improved.

The above description is only preferred embodiment of the present invention, and it should be noted that those skilled in the art can also make improvements without departing from the inventive concept of the present invention, but these improvements all belong to the protection scope of the invention.

What is claimed is:

1. A terminal device, comprising a main body and a sounding assembly assembled on the main body; wherein the sounding assembly comprises a housing movably connected to the main body, and a sounding body accommodated in the housing; the housing includes a sounding surface and a back surface opposite to the sounding surface, and the sounding surface is recessed toward the back surface to form an accommodating groove for accommodating the sounding body, and to form a first sounding channel communicating with the accommodating groove; the main body includes an exposed outer surface, an inner surface facing the sounding surface, and an extending surface extending from the inner surface to the outer surface, a receiving groove for accommodating the sounding assembly is formed by the inner surface and the extending surface; the inner surface is recessed in a direction away from the sounding body to form a second sounding channel extending to the outer surface, and a first sound emitting hole communicating with the second sounding channel is formed on the outer surface correspondingly; the terminal device further includes a cover plate fixed on the inner surface and covering the second sounding channel, and the cover plate is provided with a first through hole penetrating thereof and communicating with the second sounding channel;

the sounding assembly is moved between a first position and a second position in the receiving groove, when the sounding assembly is located at the first position, the accommodating groove is communicated with the first through hole, the first sounding channel is covered by the main body, and the sound generated by the sounding assembly is propagated to the outside of the terminal device through the first through hole, the second sounding channel and the first sound emitting hole in sequence; when the housing drives the sounding body to move in a direction away from the first through hole to the second position, at least part of the housing is exposed outwards the terminal device, the first sounding channel is communicated with the outside of the terminal device, and the sound generated by the sounding assembly is propagated to the outside of the terminal device through the first sounding channel.

2. The terminal device according to claim 1, wherein the sounding assembly further includes a baffle covered on the housing, the accommodating groove and the first sounding channel are covered by the baffle, and the baffle is arranged and spaced apart from the sounding body for forming a front chamber; the first sounding channel is communicated with the front chamber, the baffle is provided with a second through hole penetrating thereof and communicating with the front chamber; when the sounding assembly is located at the first position, the second through hole is communicated with the first through hole.

3. The terminal device according to claim 2, wherein the baffle is further provided with second sound emitting holes communicating with the first sounding channel; when the sounding assembly is located at the second position, at least part of the second sound emitting holes are exposed to the main body and communicated with the outside of the terminal device.

4. The terminal device according to claim 3, wherein the second sound emitting holes are arranged in an array on the baffle.

5. The terminal device according to claim 2, wherein when the sounding assembly is located at the first position, the second through hole is arranged coaxially with the first through hole, and a diameter of the second through hole is larger than a diameter of the first through hole.

6. The terminal device according to claim 4, wherein the baffle is recessed on a side away from the sounding body for forming a limiting slot, and the second sound emitting holes are arranged in a matrix form in the limiting slot.

7. The terminal device according to claim 6, wherein the outer surface includes a front surface opposite to the inner surface, a side surface bending and extending from an edge of the front surface toward the inner surface, and a bottom surface connected to the side surface at an end away from the front surface; the bottom surface corresponding to the sounding assembly is recessed toward the front surface to form the receiving groove, the inner surface is extended to the side surface and connected with the side surface, and the first sound emitting hole is arranged on the side surface.

8. The terminal device according to claim 7, wherein when the sounding assembly is located at the first position, the back surface and the bottom surface are spliced and coplanar.

\* \* \* \* \*